(12) United States Patent
Oostenbrink et al.

(10) Patent No.: US 12,298,918 B2
(45) Date of Patent: May 13, 2025

(54) VERIFICATION OF OFF-CHIP COMPUTER-READABLE INSTRUCTIONS AND RELATED SYSTEMS, METHODS, AND APPARATUSES

(71) Applicant: Microchip Technology Incorporated, Chandler, AZ (US)

(72) Inventors: Brian Oostenbrink, Burnaby (CA); Ariel Deneb Edward Sibley, Halifax (CA); Darshana Patel, Davis, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 228 days.

(21) Appl. No.: 18/065,372

(22) Filed: Dec. 13, 2022

(65) Prior Publication Data

US 2023/0185731 A1 Jun. 15, 2023

Related U.S. Application Data

(60) Provisional application No. 63/265,323, filed on Dec. 13, 2021.

(51) Int. Cl.
*G06F 12/14* (2006.01)
*G06F 12/0831* (2016.01)

(52) U.S. Cl.
CPC ...... *G06F 12/1408* (2013.01); *G06F 12/0835* (2013.01); *G06F 12/1458* (2013.01)

(58) Field of Classification Search
CPC ............. G06F 12/0835; G06F 12/1408; G06F 12/1458; G06F 12/00; G06F 21/54; G06F 21/57; G06F 21/79; G06F 21/72; G06F 9/4401; G06F 9/45558; H04L 67/02; H04L 67/51; H04L 9/088; H04L 9/3236; H04L 9/3247; H04L 9/3263
See application file for complete search history.

(56) References Cited

U.S. PATENT DOCUMENTS 5,265,164 A * 11/1993 Matyas ................. H04L 9/3247
380/30
8,346,929 B1 * 1/2013 Lai .......................... H04L 67/51
709/226

(Continued)

OTHER PUBLICATIONS

International Search Report for International Application No. PCT/US2022/081447, mailed Apr. 24, 2023, 5 pages.

(Continued)

*Primary Examiner* — Le H Luu
(74) *Attorney, Agent, or Firm* — TraskBritt

(57) ABSTRACT

An apparatus may comprise an off-chip data storage device and a semiconductor device package including processing circuitry and an on-chip memory device, the off-chip data storage device including master data and portions of the computer-readable instructions. The processing circuitry may retrieve a master data that includes a digital signature that may be used to verify the master data and a hash table that may include hash information for others of the portions. The processing circuitry may also verify the master instructions responsive to the digital signature, retrieve a portion, calculate a hash value of the retrieved portion, and determine whether the calculated hash value correlates to hash information of the hash table.

20 Claims, 7 Drawing Sheets

(56) References Cited

U.S. PATENT DOCUMENTS

| | | | |
|---|---|---|---|
| 8,880,824 B1* | 11/2014 | Yueh | G06F 12/00 |
| | | | 711/170 |
| 9,680,872 B1* | 6/2017 | Roth | H04L 9/3263 |
| 2005/0044197 A1* | 2/2005 | Lai | H04L 67/02 |
| | | | 709/223 |
| 2006/0132822 A1* | 6/2006 | Walmsley | G06F 21/72 |
| | | | 358/1.14 |
| 2007/0247985 A1* | 10/2007 | Ueda | H04L 9/3236 |
| | | | 369/47.1 |
| 2009/0214040 A1* | 8/2009 | Funk | H04L 9/088 |
| | | | 380/277 |
| 2016/0119148 A1 | 4/2016 | Ghose | |
| 2017/0262387 A1 | 9/2017 | Sell | |
| 2020/0097413 A1 | 3/2020 | Raval et al. | |
| 2020/0226264 A1* | 7/2020 | Xu | G06F 9/4401 |
| 2023/0036165 A1* | 2/2023 | Bursell | G06F 9/45558 |

OTHER PUBLICATIONS

Written Opinion of the International Searching Authority of International Application No. PCT/US2022/081447, mailed Apr. 24, 2023, 8 pages.

* cited by examiner

VERIFICATION OF OFF-CHIP COMPUTER-READABLE INSTRUCTIONS AND RELATED SYSTEMS, METHODS, AND APPARATUSES

CROSS-REFERENCE TO RELATED APPLICATION

This application claims the benefit of the priority date of U.S. Provisional Patent Application Ser. No. 63/265,323, filed Dec. 13, 2021, for SECURELY PAGED SOFTWARE AND RELATED SYSTEMS, METHODS, AND APPARATUSES, the disclosure of which is incorporated herein in its entirety by this reference.

TECHNICAL FIELD

This disclosure relates generally to a method for verification of off-chip computer-readable instructions.

BACKGROUND

Computer-readable instructions may be executed from on-chip memory ("OCM") and that code may be authenticated prior to execution to enhance secure execution. However, OCM is expensive as it increases die size. Also, it may be relatively difficult to accurately predict how much OCM may be used (e.g., in light of possible future upgrades or updates to the computer-readable instructions). Moreover, these problems may increase in the future as the size of software continues to generally increase.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
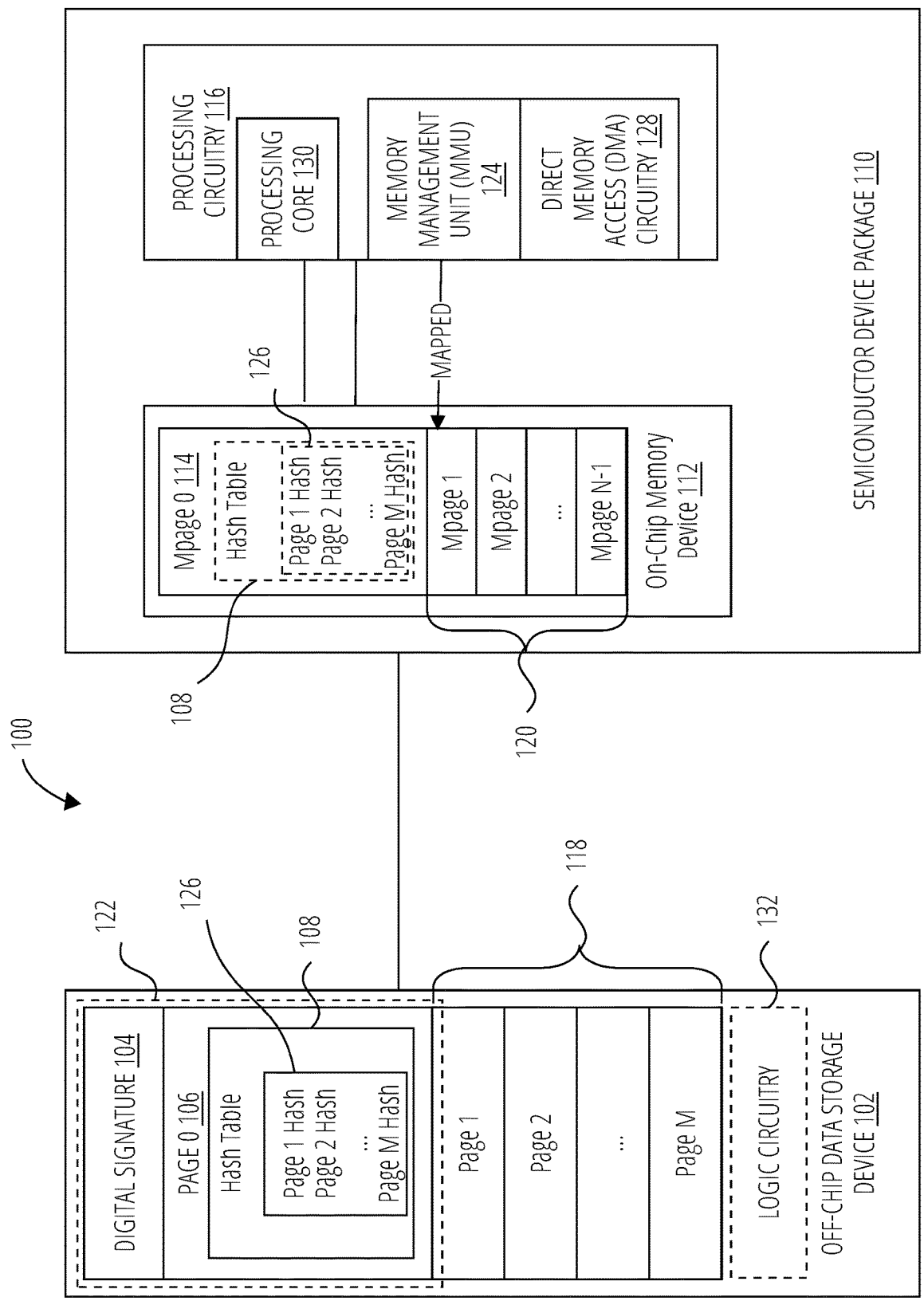
FIG. 1 is a block diagram of a computing system according to one or more examples.

Secure execution of code is becoming increasingly important for embedded software applications in order to ensure that malicious software is not allowed to be executed. One way to improve the chances that code is executed securely is to load the entire program into on-chip memory ("OCM") so that only code already on the chip can be executed. However, on-chip memory is increasingly expensive and large amounts of OCM may increase cost by leading to larger die areas. Additionally, this approach does not allow for the possibility of executing code from off-chip storage, making some programs difficult or impossible to be executed due to their size because the amount of available memory may be limited in OCM. Some approaches to attempt to securely execute firmware from off-chip storage may involve the entire off-chip storage being memory mapped into a central processing unit's (CPU's) address space. In these approaches, the CPU may first authenticate the entire firmware image in the off-chip storage and then execute directly from that storage. These approaches, however, have a significant security limitation in that tampering with the image off-chip after the initial authentication may not necessarily, in some instances, be detected by the CPU. Thus, a secure system in these approaches may involve a trust zone to extend beyond the chip itself to include the off-chip storage device.

Various examples according to the present disclosure may relate to a system for storing verification data in an always-resident on-chip portion of the software image, and automatically swapping and verifying other pages upon request by the system. Specifically, various examples of the present disclosure may relate to a method that stores a table of firmware page hashes in on-chip memory. The hash table is stored in off-chip memory with a digital signature (e.g., using Rivest-Shamir-Adleman (RSA) cryptographic algorithms or an elliptic curve digital signature algorithm (ECDSA)), along with the entire firmware image. The table may be read and verified on device boot-up, and used to verify firmware pages as they are dynamically retrieved into on-chip memory for execution. A page may include one or more portions of computer-readable instructions of the firmware image. A set of on-chip pages may be provided, along with counters to monitor page usage over time. The on-chip pages may store one or more portions of computer-readable instructions from the off-chip memory for subsequent execution by the processor. On a processor page miss (e.g., an attempt to execute a computer-readable instruction not loaded onto the on-chip memory), a page may be selected from the existing set of loaded pages (e.g., loaded into OCM), using one of a number of algorithms, such as a least-used, a least-recently-used algorithm, or a random eviction algorithm, without limitation. The data from this page may be evicted and removed from a Memory Management Unit (MMU) table in the processor and the data may be replaced in the page with data using direct memory access ("DMA") from off-chip storage. This data may be decrypted into the on-chip page. A secure hashing algorithm (SHA) hash of the decrypted data stored in the on-chip page is then calculated, generated, or otherwise obtained, and compared to the expected value in the verified hash table. Any failure or mismatch of the SHA hash may be considered a security breach and may cause the data stored in the on-chip page to be immediately evicted and force the CPU into an error state. However, if the SHA hash matches an expected hash stored in the hash table, a portion of computer-readable instructions stored on the page may be executed and the CPU may resume normal operation.

This process may increase the chances that the code executing on the chip is a verified portion of the full firmware image, without extending trust to outside the chip boundaries. This may allow for increased flexibility in the choice of off-chip storage solutions. It also may allow a device to securely execute a software image that is larger than its OCM. For example, this method may be used by devices with an embedded CPU and relatively small OCM (e.g., insufficient to store the software image) and a large software application (e.g., too large to be stored by the on-chip memory) stored off-chip in non-volatile storage such as a flash memory connected over a serial peripheral interface (SPI). Accordingly, the simplicity and security offered by such an approach may help to improve a device that involves securely executing software where code sizes are large (e.g., most modern devices). For example, one or more examples of the present disclosure may allow for devices with less OCM, thereby reducing the amount of chip space required by the OCM and may thereby also reduce the costs associated with OCM.

As used herein the term "page" or "pages" may be synonymous with a "page buffer" or "page buffers," respectively.

FIG. 1 is a block diagram of a system 100 according to one or more examples. The system 100 may include an off-chip data storage device 102 and a semiconductor device package 110. The off-chip data storage device 102 may store a master data 122 and one or more computer-readable instructions 118 in pages 1-M. The master data 122 may include page 0 106 and a digital signature 104 for verifying the master data 122. Page 0 106 may include a hash table 108 which may include hash information 126. The hash information 126 of the hash table 108 may include hash representations page 1 hash through page M hash of respective portions of the computer-readable instructions 118 stored on pages 1-M. For example, respective pages of pages 1-M may store a portion of the computer-readable instructions 118 and respective hash representation page 1 hash through page M hash of the hash information 126 may correlate to (e.g., be a hash representation of) a respective portion of the computer-readable instructions 118. Additionally, Page 0 106 may include data for public/private key cryptography (discussed below) and program data for a firmware program, interrupt or exception handlers, stacks, operating system code, and any code relating to page swapping and optimization code relating to the firmware image. The off-chip data storage device 102 may also store a digital signature 104 for verifying the data stored in page 0 106.

The semiconductor device package 110 may include an on-chip memory device 112 and processing circuitry 116. The on-chip memory device 112 may include Mpage 0 114 as well as on-chip pages 120, including Mpage 1-(N−1). Mpage 0 114 may store a copy of the hash table 108 as well as other data transferred to the on-chip memory device 112 from page 0 106 of the off-chip data storage device 102. The on-chip pages 120 may store one or more portions of the computer-readable instructions 118. The processing circuitry 116 may include a memory management unit ("MMU") 124, a processing core 130, and direct memory access circuitry (DMA) 128. The MMU 124 may map one or more portions of computer-readable instructions 118 stored in the on-chip pages 120. For example, the MMU 124 may store (e.g., in a table ("MMU table," without limitation)) a list of indicators identifying portions of executable instructions for executing a firmware and one or more memory addresses of an on-chip memory block of the on-chip pages 120 where respective one or more of the portions of the computer-readable instructions 118 may be stored. Stated more generally, the MMU 124 may include an indicator for each portion of computer-readable instructions (e.g., computer-readable instructions 118) of a program and the order for which the indicated portions of computer-readable instructions should be executed. The MMU 124 may also map the indicator to a memory address of an on-chip memory block (e.g., Mpage 1-(N−1)) where the portion of the computer-readable instructions 118 that correlates to the indicator is stored. The on-chip pages may have pre-determined addresses in memory.

As a non-limiting example, the computer-readable instructions 118 may be organized in a virtual address space at compile time where respective virtual addresses of the virtual address space correspond to respective portions of the computer-readable instructions 118. Based on what portions of the firmware are being executed during run-time, one or more portions of the computer-readable instructions 118 may be stored in a respective page of the on-chip pages 120. The MMU may map one or more virtual addresses of the virtual address space to one or more physical addresses of the on-chip pages 120 where one or more respective portions of the computer-readable instructions 118 that corresponds to the one or more virtual addresses are stored. When the processing circuitry 116 accesses a particular virtual address, the MMU may generate a corresponding physical on-chip memory page address to allow the processing circuitry to execute the portion of the computer-readable instructions 118 stored at the corresponding physical on-chip memory page address. If the processing circuitry 116 accesses a virtual address with no mapped physical address, a "page miss" may occur.

The off-chip data storage device 102 may be separate (e.g., physically separate) from the semiconductor device package 110. In other examples, both the off-chip data storage device 102 and the on-chip memory device 112 may be located on the same package (e.g., on a multi-chip module) but on separate dies.

The DMA circuitry 128 initiates transfer of portions of the computer-readable instructions 118 from the off-chip data storage device 102 to the on-chip memory device 112. The DMA circuitry 128 may be separate from (i.e., able to perform functions separate and without aid from) the processing core 130 of the processing circuitry 116. The processing core 130 may execute the portions of the computer-readable instructions 118 that are stored on the on-chip memory device 112.

Figure 2A:
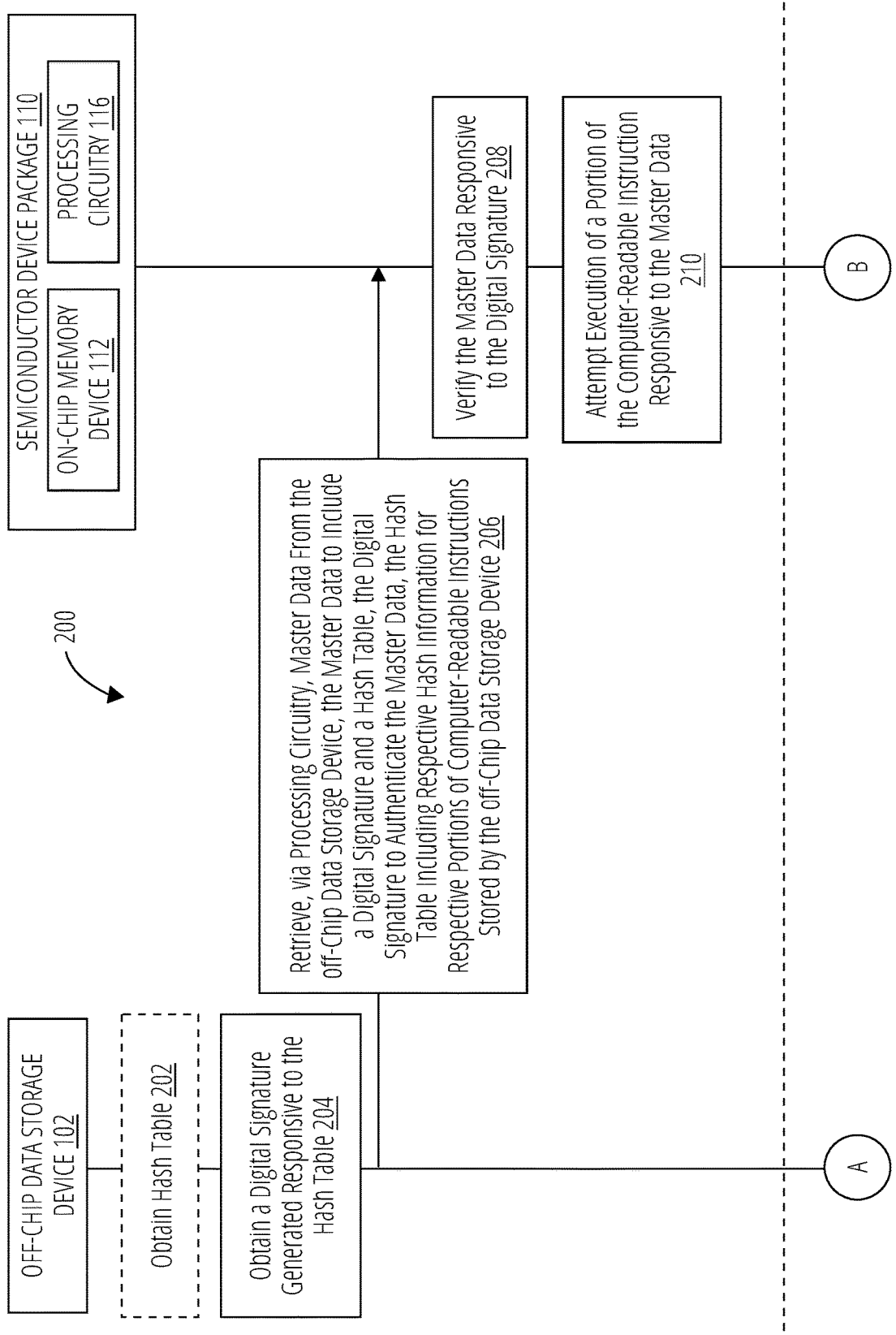
FIGS. 2A-2C illustrate a sequence-flow diagram that the computing system of FIG. 1 may utilize to securely execute computer-readable instructions from an off-chip data storage device.
Figure 2B:
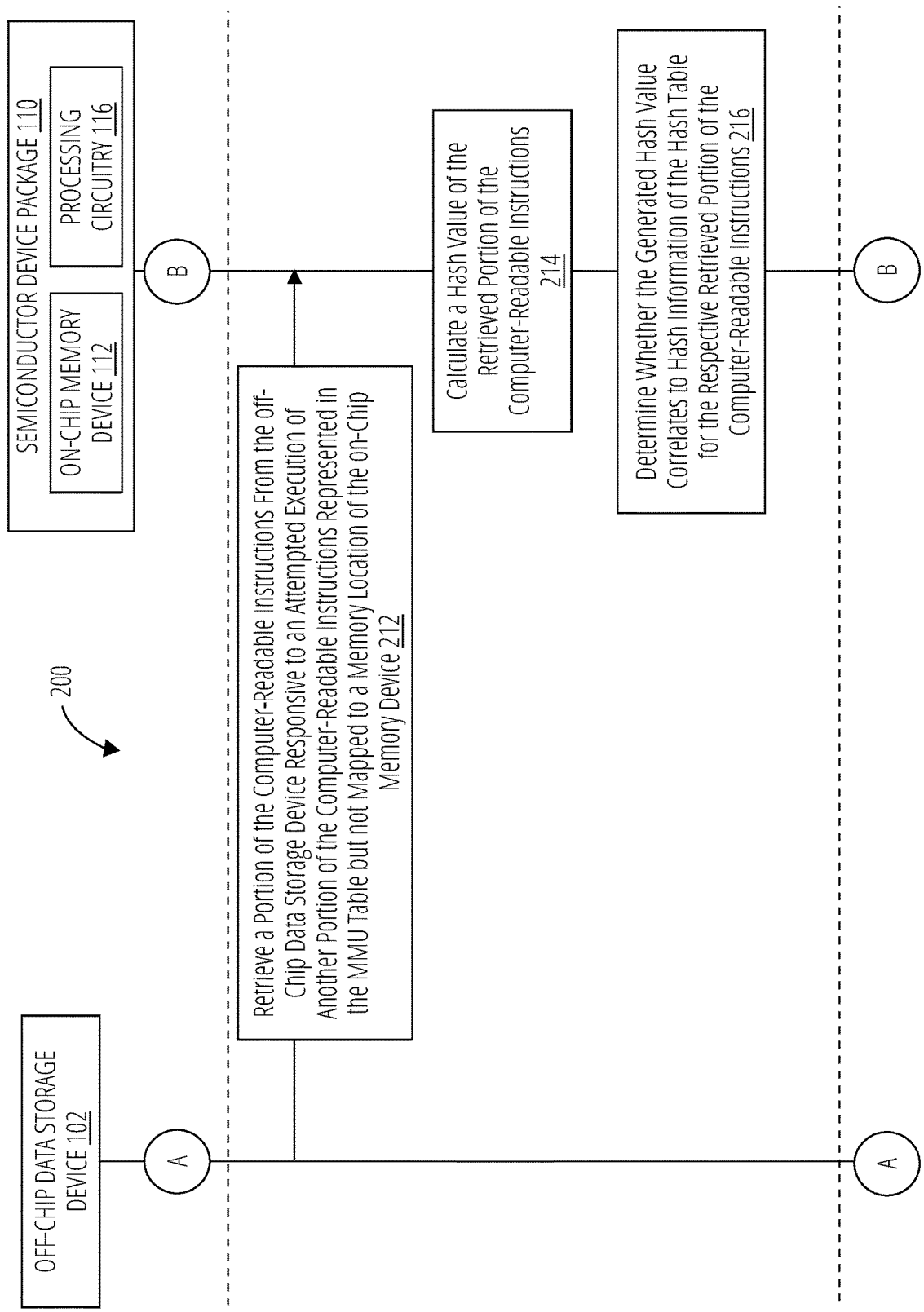
Figure 2C:
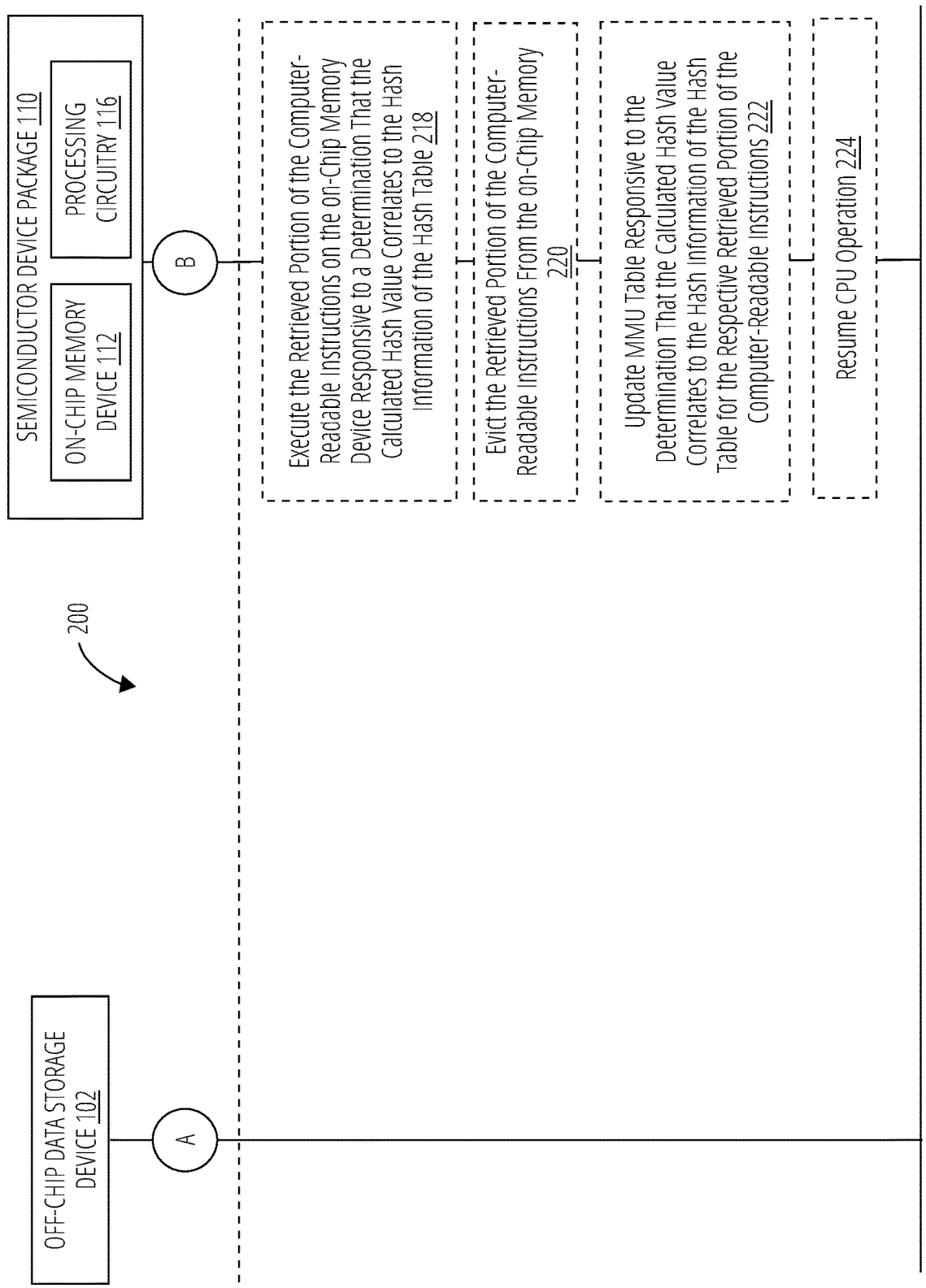

FIGS. 2A-2C illustrate a sequence-flow diagram 200 that a system 100 may utilize to securely execute computer-readable instructions 118 (FIG. 1) from an off-chip data storage device (e.g., off-chip data storage device 102). The off-chip data storage device 102 and the semiconductor device package 110 shown in FIGS. 2A-2C may be as described with reference to FIG. 1.

Referring to the sequence-flow diagram 200 of FIG. 2A and to FIG. 1 together, an off-chip data storage device 102 may obtain (e.g., store) a hash table 108, as shown in act 202. For example, the hash table 108 containing the hash information 126 may be calculated external to the off-chip data storage device 102 and then stored on the off-chip data storage device 102. For example, the hash information 126 of the hash table 108 may be calculated using known hashing algorithms including MD5, SHA-1, SHA-256, SHA-348, SHA-512, NTLM, LANMAN, without limitation to hash each portion of the computer-readable instructions 118 stored in pages 1-N of the off-chip data storage device 102 and compile the resulting hash representations of each portion of the computer-readable instructions 118 into a hash table. The resulting hash table 108 containing hash information 126 may be included, i.e., stored, in page 0 106 along with other program data discussed above in FIG. 1. In some examples, the off-chip data storage device 102 may generate, via logic circuitry 132, the hash table 108 containing hash information 126 that correlates to hash representations of one or more portions of computer-readable instructions 118.

Furthermore, the off-chip data storage device 102 may also obtain (e.g., store) a digital signature 104 that was generated responsive to the hash table 108 as well as other data stored in page 0, as shown in act 204. For example, the digital signature may be generated (e.g., calculated) external to the off-chip data storage device 102 responsive to the hash table 108 and stored on the off-chip data storage device 102. The digital signature 104 may be used to sign the data contained in page 0 106. To generate the digital signature 104 the data contained in page 0 106 may be hashed and encrypted (e.g., using RSA or an ECDSA, without limitation) using a private key. The digital signature 104 may then be obtained (e.g., stored) by the off-chip data storage device 102 and appended to the data stored in page 0 106 to "sign" the data. In some examples, the digital signature 104 may be generated by the off-chip data storage device 102 via logic circuitry 132.

As shown in FIG. 2A, in act 206, the semiconductor device package 110 may retrieve, via processing circuitry 116, master data 122 from the off-chip data storage device 102. The master data 122 includes the digital signature 104 and the hash table 108. The digital signature 104 is utilized by the semiconductor device package 110 to verify the master data 122 including the hash table 108, which hash table 108 including respective hash information 126 for respective portions of computer-readable instructions 118 stored by the off-chip data storage device 102.

As shown in FIG. 2A, after receiving the master data 122, the semiconductor device package 110 may verify the master data 122 responsive to the digital signature. For example, the semiconductor device package 110 may calculate a first hash representation of the data that was in page 0 106 and decrypt the digital signature 104 utilizing a public key that corresponds to the private key used to generate the digital signature to obtain a second hash representation. The first and second hash representations are then compared and if it is determined, based on the comparison, that the hash representations are the same (e.g., as incited via a bit-wise comparison, without limitation), then the master data 122 may be verified as shown in act 208. As discussed above with respect to FIG. 1, the master data may include program data for executing the computer-readable instructions 118 stored on the off-chip data storage device 102. The master data 122 may include indications for execution instructions used to execute the computer-readable instructions 118 in a pre-determined order.

As discussed above with respect to FIG. 1, the MMU 124 may at least partially map the indications for execution instructions to memory addresses of the on-chip pages for execution. For example, when a portion of the computer-readable instructions 118 is stored on the on-chip memory device in one of the on-chip pages, the MMU may associate the memory address of the on-chip page where the portion of the computer-readable instructions 118 is stored with an indication (e.g., a virtual address) that correlates to (e.g., identifies) a portion of the computer-readable instructions 118, i.e. a memory address. The semiconductor device package 110 may attempt execution of a portion of the computer-readable instructions 118 responsive to the master data 122, as shown in act 210. For example, the MMU may attempt to execute a portion of the computer-readable instructions 118 responsive to a pre-determined list of indications for execution instructions. Specifically, each indication of the list of indications may be mapped to an associated memory address that stores a portion of the computer-readable instructions 118 that correlates to the indication. If the semiconductor device package 110 attempts to execute a portion of the computer-readable instructions 118 that is not stored in the on-chip pages 120, a "page miss" may occur (e.g., Mpages 1-(N–1) do not contain the respective portion of the computer-readable instructions 118 or no mapping of an indication of the portion of the computer-readable instructions 118 to a memory address of the on-chip pages exists). Upon a page miss, the semiconductor device package 110 may determine if each page of the on-chip pages 120 is occupied by a portion of the computer-readable instructions 118. If each page is occupied, then the semiconductor device package 110 may evict (e.g., free) the data in at least one page of the on-chip pages 120 and flag the page as available for storage to the DMA.

The semiconductor device package 110 may evict the data in a page based on a "least used" algorithm, a "least recently used" algorithm, or a random eviction algorithm, without limitation. As a non-limiting example, a least-used algorithm may count the number of executions of respective portions of the computer-readable instructions 118, and determine which page of the on-chip pages 120 contains a portion of the computer-readable instructions 118 that has been executed less than each other portion of the computer-readable instructions 118 stored in the other pages of the on-chip pages 120. The data in the determined page may be evicted. As another non-limiting example, a least recently used algorithm may count the number of executions of respective portions of the computer-readable instructions 118 during a predetermined number of immediately previous successful instruction executions. The least recently used algorithm may determine which page of the on-chip pages 120 contains a portion of the computer-readable instructions 118 that has been executed less than each other portion of the computer-readable instructions 118 stored in the other pages of the on-chip pages 120 for a predetermined number of immediately previous successful instruction executions (e.g., the immediately previous 10, 100, 1,000, 10,000, without limitation, successful instruction executions).

In some examples, and with reference to FIG. 2B, the semiconductor device package 110 may retrieve a portion of the computer-readable instructions 118 from the off-chip data storage device 102. More specifically, as shown in act 212 of FIG. 2B, the semiconductor device package 110 may retrieve a portion of the computer-readable instructions 118 from the off-chip data storage device 102 responsive to an attempted execution of another portion of the computer-readable instructions 118 represented in the MMU table, but not mapped to a memory location of the on-chip memory device (e.g., a page of the on-chip pages 120). In some examples, the retrieved portion of the computer-readable instructions 118 may be stored in a page of the on-chip pages 120. For example, retrieving the portion may include storing the retrieved portion in a page recently freed up as a result of a determination that each of the pages was full and a resulting eviction of the data previously in the freed page. In other examples, the retrieved portion of the computer-readable instructions may only be stored after verifying the retrieved portion of the computer-readable instructions (the verification process discussed in more detail below with regard to acts 214 and 216). As discussed above with regard to FIG. 1, the portion of the computer-readable instructions 118 may be retrieved via the DMA circuitry 128 of the processing circuitry 116.

Upon retrieval of the portion of the computer-readable instructions 118, the semiconductor device package 110 may calculate a hash value of the retrieved portion of the computer-readable instructions, as shown in act 214. For example, the semiconductor device package 110 may retrieve the portion of the computer-readable instructions 118 and then calculate a hash representation (e.g., the hash value) of the portion via a hashing algorithm. In some examples, the portions of the computer-readable instructions may be stored on the off-chip data storage device 102 such that each page of the pages 1-M stores both the portion and a hash of the portion, which may then be retrieved together.

After calculating the hash value for the retrieved portion of the computer-readable instructions 118, the semiconductor device package 110 may determine whether the calculated hash value correlates to hash information 126 of the hash table 108 for the respective retrieved portion of the computer-readable instructions 118, as shown in act 216. For example, the semiconductor device package 110 may compare the calculated hash value for the retrieved portion of the computer-readable instructions 118 to respective hash information 126 (e.g., an expected hash value) of the hash table 108 for the respective portion of the computer-readable instructions 118, stored in Mpage 0 114.

In one or more examples, the semiconductor device package 110 may evict data (e.g., a portion of the computer-readable instructions 118 as discussed above) responsive to a determination that the calculated hash value correlates to the hash information 126 of the hash table 108. For example, if the on-chip pages 120 are full, the semiconductor device package 110 may not evict a portion of the computer-readable instructions 118 from one of the pages 120 until the determination that the hash of the retrieved portion of the computer-readable instructions 118 correlates to the hash information 126 of the hash table 108. Upon making the determination that the retrieved portion of the computer-readable instructions 118 and the hash information 126 correlate, the semiconductor device package 110 may then evict data from one or more pages of the on-chip pages 120 (e.g., using a least used, least recently used algorithm, or random eviction algorithm, without limitation, as discussed above).

As shown in FIG. 2C, the semiconductor device package 110 may then execute the retrieved portion of the computer-readable instructions 118 on the on-chip memory device 112 responsive to a determination that the calculated hash value correlates to the hash information 126 of the hash table 108, as shown in act 218. For example, a hash value may correlate to the hash information 126 of the hash table 108 if the calculated hash value matches a hash value of the hash information 126 of the hash table 108. If, however, the hash value of the retrieved portion of the computer-readable instructions 118 does not correlate to the hash information 126 of the hash table 108, the semiconductor device package 110 may evict the retrieved portion of the computer-readable instructions 118 from the on-chip memory device, as shown in act 220. Moreover, the semiconductor device package 110 may then enter an error state. In the case that the retrieved portion of the computer-readable instructions 118 was obtained and not yet stored, the semiconductor device package 110 may discard the retrieved portion of the computer-readable instructions 118 without storing the retrieved portion on the on-chip memory device responsive to a determination that the hash value of the retrieved portion of the computer-readable instructions 118 does not correlate to the hash information 126 of the hash table 108.

The semiconductor device package 110 may then update the MMU table responsive to the determination that the calculated hash value correlates to the hash information 126 of the hash table 108 for the respective retrieved portion of the computer-readable instructions 118, as shown in act 222. For example, the semiconductor device package 110 may update the MMU table to map an indicator of the retrieved portion of the computer-readable instructions 118 of the firmware image obtained from the off-chip data storage device 102 to a memory address of a page of the on-chip pages 120 for subsequent execution. The semiconductor device package 110 may then resume CPU (e.g., processing circuitry 116, without limitation) operation, as shown in act 224. For example, the semiconductor device package 110 may immediately execute the retrieved portion of the computer-readable instructions 118 and then attempt to execute a next portion of the computer-readable instructions 118.

Figure 3A:
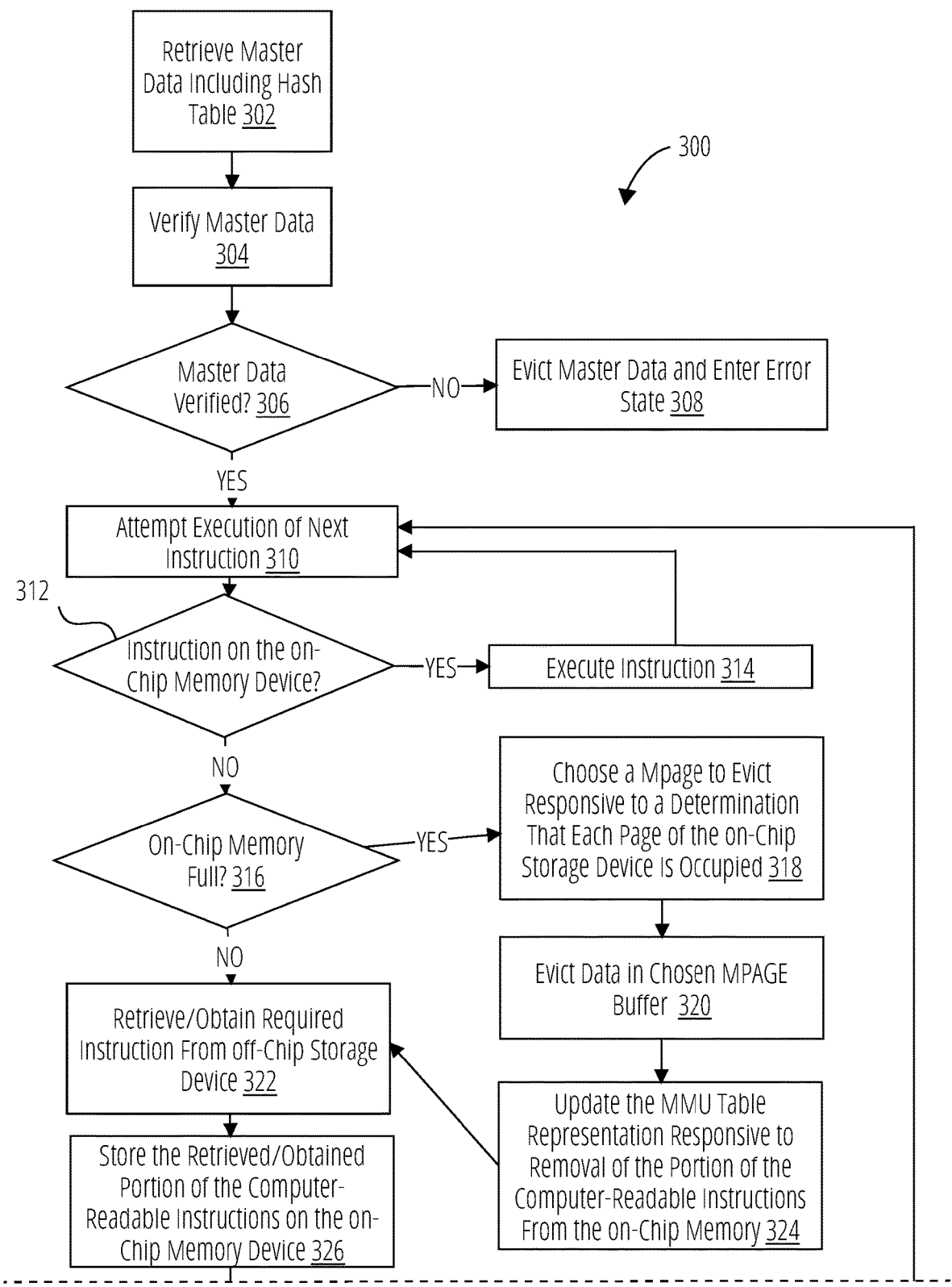
FIGS. 3A-3B illustrates an operational flowchart performed by processing circuitry of the semiconductor device package included in the system of FIG. 1, according to one or more examples.
Figure 3B:
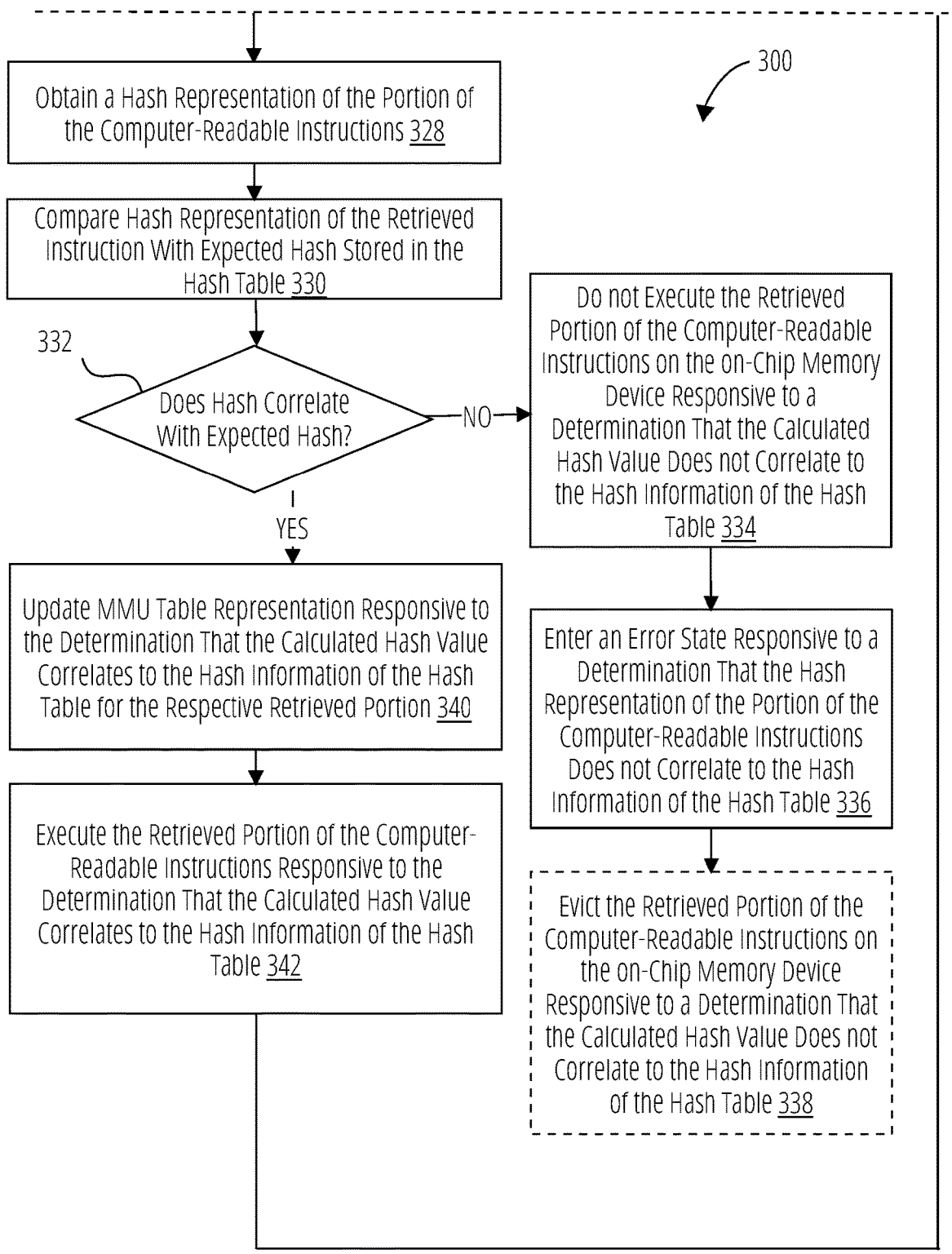

FIGS. 3A-3B illustrates an operational flowchart performed by processing circuitry 116 of the semiconductor device package 110 included in the system 100. Referring to FIG. 1 and FIGS. 3A-3B together, at operation 302, the processing circuitry 116 may retrieve master data 122 (e.g., via the DMA circuitry 128) from an off-chip data storage device 102. The master data 122 includes a digital signature 104 and a hash table 108. The digital signature 104 verifies the master data 122 at least partially responsive to digital signature 104. The hash table 108 includes respective hash information 126 for respective portions of computer-readable instructions 118 stored by the off-chip data storage device 102. At operation 304, the processing circuitry 116 may verify the master data 122 responsive to the digital signature 104.

At decision block 306, the master data 122 is verified, or not. If the master data 122 is verified, then the processing circuitry 116 may continue to operation 310. If the master data 122 is not verified (e.g., not verified as discussed above, without limitation), then the processing circuitry 116 may proceed to operation 308 where the processing circuitry 116 causes the system 100 to evict the master data from and enter an error state.

At operation 310, the processing circuitry 116 may attempt execution of a next instruction. At decision block 312, the processing circuitry 116, if the next instruction is found in the on-chip memory device 112, then the processing circuitry proceeds to operation 314 and executes the instruction and then continues back to operation 310 to attempt to execute another next instruction. If the next instruction is not on the on-chip memory device 112, then the processing circuitry 116 may proceed to decision block 316 to check whether every page of the on-chip pages 120 is already occupied. If no, then the processing circuitry 116 continues to operation 322. If yes, then then the processing circuitry 116 proceeds to operation 318. At operation 318, the processing circuitry 116 may choose an Mpage to evict responsive to a determination that each page of the on-chip storage device is occupied. For example, the processing circuitry may calculate which of Mpage 1-(N−1) contains a portion of the computer-readable instructions 118 that has been executed less than other portions of the computer-readable instructions 118 overall or for a predetermined number of past successful instruction executions to evict. In another example the processing circuitry 116 may also select a page from Mpages 1-(N−1) at random. Though discussed in terms of specific algorithms for choosing a page from Mpages 1-(N−1), this disclosure is not so limited and any algorithm for choosing one page from a group of pages may be used.

After an Mpage is chosen, the processing circuitry 116 may then evict (e.g., free) the data (e.g., a portion of the computer-readable instructions 118, without limitation) in the chosen Mpage, at operation 320. At operation 324, the processing circuitry 116 updates the MMU table representation of the portions of the computer-readable instructions 118, wherein one or more portion representations are updated responsive to removal of the portion of the computer-readable instructions 118 from the chosen Mpage from the on-chip memory device 112 of operation 320, and proceeds to operation 322.

At operation 322, the processing circuitry 116 retrieves or otherwise obtains a portion of the computer-readable instructions 118 containing the next instruction from the off-chip data storage device 102 (e.g., retrieves a copy of data stored in a page of the pages 1-M from the off-chip data storage device, the data including the portion of the computer-readable instructions 118 that contains the next instruction). At operation 326, the processing circuitry 116 may store the retrieved or otherwise obtained portion of the computer-readable instructions 118 on the on-chip memory device 112. For example, the retrieved portion may be stored in the chosen page that was evicted in operation 320 or may be stored in an already free page, or in a page buffer. At operation 328 of FIG. 3B, the processing circuitry 116 obtains a hash representation of the retrieved or otherwise obtained portion of the computer-readable instructions 118. At operation 330, the processing circuitry 116 compares the hash representation of the retrieved portion to an expected hash stored in the hash table 108, e.g., stored in Mpage 0 114, and determines whether the calculated/obtained hash value correlates to the hash information 126 of the hash table 108 for the respective retrieved portion of the computer-readable instructions 118.

At decision block 332, if the hash representation of the retrieved portion correlates with the expected hash stored in the hash table 108, the processing circuitry 116 continues to operation 338. If the hash representation of the retrieved portion does not correlate with the expected hash stored in the hash table 108, the processing circuitry 116 proceeds to operation 334. At operation 334, the processing circuitry 116 does not execute the retrieved portion of the computer-readable instruction on the on-chip memory, responsive to the determination that the calculated hash value does not correlate to the hash information of the hash table. For example, the obtained hash value may not correlate to the hash information 126 if the hash value does not match the hash information 126. At operation 336, the processing circuitry 116 enters an error state responsive to the determination that the hash representation of the portion of the computer-readable instructions 118 does not correlate to the hash information 126 of the hash table 108. At operation 338, the processing circuitry 116 may evict the retrieved portion of the computer-readable instructions on the on-chip memory device responsive to a determination that the calculated hash value does not correlate to the hash information 126 of the hash table 108.

At operation 340, the processing circuitry 116 updates the MMU table representation (e.g., adds a mapping to the memory address where the retrieved portion has been stored, without limitation) responsive to the storage of one of the portions of the computer-readable instructions 118 on the on-chip memory device 112. At operation 342, the processing circuitry 116 may execute the retrieved portion of the computer-readable instructions 118 stored in one of the on-chip pages 120 at least partially responsive to the determination that the obtained (e.g., generated, calculated, without limitation) hash value (e.g., hash representation, without limitation) correlates to the hash information 126 of the hash table 108. The processing circuitry may then proceed back to operation 310 to attempt execution of the next instruction.

Figure 4:
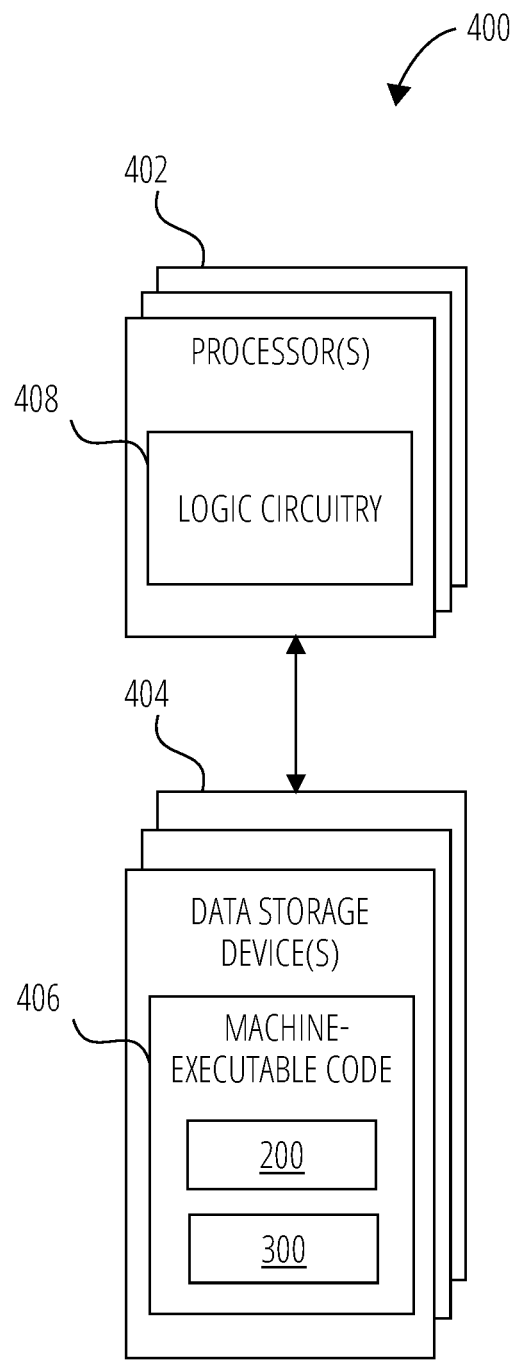
FIG. 4 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, or methods, without limitation) may be implemented in any suitable hardware, software, firmware, or combinations thereof. FIG. 4 illustrates non-limiting examples of implementations of functional elements disclosed herein. In some examples, some or all portions of the functional elements disclosed herein may be performed by hardware specially programmed for carrying out the functional elements.

FIG. 4 is a block diagram of circuitry 400 that, in some examples, may be used to implement various functions, operations, acts, processes, and/or methods disclosed herein. The circuitry 400 includes one or more processors 402 (sometimes referred to herein as "processors 402") operably coupled to one or more data storage devices (sometimes referred to herein as "storage 404"). The storage 404 includes machine-executable code 406 stored thereon and the processors 402 include logic circuitry 408. The machine-executable code 406 includes information describing functional elements that may be implemented by (e.g., performed by, without limitation) the logic circuitry 408. The logic circuitry 408 is adapted to implement (e.g., perform, without limitation) the functional elements described by the machine-executable code 406. The circuitry 400, when executing the functional elements described by the machine-executable code 406, should be considered as special purpose hardware for carrying out functional elements disclosed herein. In some examples the processors 402 may perform the functional elements described by the machine-executable code 406 sequentially, concurrently (e.g., on one or more different hardware platforms), or in one or more parallel process streams.

When implemented by logic circuitry 408 of the processors 402, the machine-executable code 406 adapts the processors 402 to perform operations of examples disclosed herein. For example, the machine-executable code 406 may adapt the processors 402 to perform at least a portion or portions of sequence-flow diagram 200 relating to operation of the processing circuitry 116 of FIGS. 2A-2C or the operational flow chart 300 of FIGS. 3A-3B.

The processors 402 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine-executable code 406 (e.g., software code, firmware code, hardware descriptions, without limitation) related to examples of the present disclosure. It is noted that a general-purpose processor (may also be referred to herein as a host processor or simply a host) may be a microprocessor, but in the alternative, the processors 402 may include any conventional processor, controller, microcontroller, or state machine. The processors 402 may also be implemented as a combination of computing devices, such as a combination of a DSP and a microprocessor, a plurality of microprocessors, one or more microprocessors in conjunction with a DSP core, or any other such configuration.

In some examples the storage 404 includes volatile data storage (e.g., random-access memory (RAM)), non-volatile data storage (e.g., Flash memory, a hard disc drive, a solid-state drive, erasable programmable read-only memory (EPROM), without limitation). In some examples the processors 402 and the storage 404 may be implemented into a single device (e.g., a semiconductor device product, a system on chip (SOC), without limitation). In some examples the processors 402 and the storage 404 may be implemented into separate devices.

In some examples the machine-executable code 406 may include computer-readable instructions (e.g., software code, firmware code, without limitation). By way of non-limiting example, the computer-readable instructions may be stored by the storage 404, accessed directly by the processors 402, and executed by the processors 402 using at least the logic circuitry 408. Also by way of non-limiting example, the computer-readable instructions may be stored on the storage 404, transferred to a memory device (not shown) for execution, and executed by the processors 402 using at least the logic circuitry 408. Accordingly, in some examples the logic circuitry 408 includes electrically configurable logic circuitry 408.

In some examples the machine-executable code 406 may describe hardware (e.g., circuitry) to be implemented in the logic circuitry 408 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large-scale integration (VLSI) hardware description language (VHDL™) may be used.

HDL descriptions may be converted into descriptions at any of numerous other levels of abstraction as desired. As a non-limiting example, a high-level description may be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 408 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 406 may include an HDL, an RTL, a GL description, a mask level description, other hardware description, or any combination thereof.

In examples where the machine-executable code 406 includes a hardware description (at any level of abstraction), a system (not shown, but including the storage 404) may implement the hardware description described by the machine-executable code 406. By way of non-limiting example, the processors 402 may include a programmable logic device (e.g., an FPGA or a PLC, without limitation) and the logic circuitry 408 may be electrically controlled to implement circuitry corresponding to the hardware description into the logic circuitry 408. Also by way of non-limiting example, the logic circuitry 408 may include hard-wired logic manufactured by a manufacturing system (not shown, but including the storage 404) according to the hardware description of the machine-executable code 406.

Regardless of whether the machine-executable code 406 includes computer-readable instructions or a hardware description, the logic circuitry 408 is adapted to perform the functional elements described by the machine-executable code 406 when implementing the functional elements of the machine-executable code 406. It is noted that although a hardware description may not directly describe functional elements, a hardware description indirectly describes functional elements that the hardware elements described by the hardware description are capable of performing.

In the foregoing detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is programmed to execute computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "RSA" may refer to any cryptographic algorithm based on the Rivest-Shamir-Adleman public-key cryptosystem used for securing data transmission.

As used herein, the term "ECDSA" may refer to any elliptic curve based algorithm used for digital signatures for transmitted data.

As used in the present disclosure, the terms "module" or "component" may refer to specific hardware implementations that perform the actions of the module or component and/or software objects or software routines that may be stored on and/or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
    a semiconductor device package including a processing circuitry and an on-chip memory device; and
    an off-chip data storage device including master data and computer-readable instructions stored thereon, the master data including a digital signature and a hash table, the digital signature for verifying the master data, the hash table including respective hash information for respective portions of the computer-readable instructions;
    wherein the processing circuitry to:
        retrieve the master data from the off-chip data storage device;
        verify the master data responsive to the digital signature;
        retrieve a portion of the computer-readable instructions from the off-chip data storage device;
        calculate a hash value of the retrieved portion of the computer-readable instructions;
        determine whether the calculated hash value correlates to the respective hash information of the hash table of the master data for the respective retrieved portion of the computer-readable instructions;
        execute the retrieved portion of the computer-readable instructions on the on-chip memory device responsive to a determination that the calculated hash value correlates to the respective hash information of the hash table; and
        do not execute the retrieved portion of the computer-readable instructions on the on-chip memory device responsive to a determination that the calculated hash value does not correlate to the respective hash information of the hash table.

2. The apparatus of claim 1, wherein the processing circuitry evicts a portion of the computer-readable instructions from the on-chip memory device responsive to a determination that the on-chip memory device is full.

3. The apparatus of claim 1, the processing circuitry comprising a memory management unit (MMU) including a table representation of the respective portions of the computer-readable instructions, wherein one or more portion representations of the table representation are mapped to memory locations in the on-chip memory device.

4. The apparatus of claim 3, the processing circuitry to update the table representation responsive to the determination that the calculated hash value correlates to the respective hash information of the hash table for the respective retrieved portion of the computer-readable instructions.

5. The apparatus of claim 4, wherein updating the table representation comprises adding, or removing, a mapping of a representation of one of the portions of the computer-readable instructions to, or from, a memory location of the on-chip memory device.

6. The apparatus of claim 1, wherein the on-chip memory device includes pages having pre-determined addresses in memory, the pages to store respective portions of the computer-readable instructions.

7. The apparatus of claim 6, the processing circuitry to:
    choose a page of the pages to evict responsive to a determination that each page of the pages is occupied;
    evict data in the chosen page; and
    store the retrieved portion of the computer-readable instructions in the chosen page.

8. The apparatus of claim 7, wherein one portion is a least-recently used portion of a subset of the portions stored in the pages.

9. The apparatus of claim 7, wherein one portion is a least used portion of a subset of the portions stored in the pages.

10. The apparatus of claim 7, wherein one portion is a randomly chosen portion of a subset of the portions stored in the pages.

11. The apparatus of claim 1, wherein the processing circuitry includes a processing core and a direct memory access (DMA) circuitry separate from the processing core.

12. The apparatus of claim 11, the DMA circuitry to retrieve the respective portions of the computer-readable instructions from the off-chip data storage device independently from the processing core and store the retrieved portion of the computer-readable instructions on the on-chip memory device.

13. The apparatus of claim 1, the processing circuitry to enter an error state responsive to the determination that the calculated hash value does not correlate to the respective hash information of the hash table.

14. A method, comprising:
    retrieving, via a processing circuitry, master data from an off-chip data storage device, the master data to include a digital signature and a hash table, the digital signature to verify the master data, the hash table including respective hash information for respective portions of computer-readable instructions stored by the off-chip data storage device;
    verifying the master data responsive to the digital signature;
    retrieving a portion of computer-readable instructions from the off-chip data storage device;
    calculating a hash value of the retrieved portion of the computer-readable instructions;
    determining whether the calculated hash value correlates to hash information of the hash table of the master data for the respective retrieved portion of the computer-readable instructions;
    executing the retrieved portion of the computer-readable instructions on an on-chip memory device for execution, by the processing circuitry, responsive to a determination that the calculated hash value correlates to the hash information of the hash table; and
    not executing the retrieved portion of the computer-readable instructions on the on-chip memory device for execution, by the processing circuitry, responsive to a determination that the calculated hash value does not correlate to the hash information of the hash table.

15. The method of claim 14, the processing circuitry comprising a memory management unit (MMU), the MMU including a table representation of one or more portions of the computer-readable instructions mapped to locations in memory of the on-chip memory device.

16. The method of claim 15, comprising retrieving the one or more portions of the computer-readable instructions responsive to an attempted execution of another portion of the computer-readable instructions represented in the MMU table but not mapped to a memory location of the on-chip memory device.

17. A computing system comprising:
a semiconductor device package including a processing circuitry and an on-chip memory device; and
an off-chip data storage device including master data and computer-readable instructions stored thereon, the master data including a digital signature and a hash table, the digital signature for verifying the master data, the hash table including respective hash information for respective portions of the computer-readable instructions;
wherein the processing circuitry to:
retrieve the master data from the off-chip data storage device;
verify the master data via the digital signature;
obtain a portion of the computer-readable instructions from the off-chip data storage device;
obtain a hash representation of a portion of the computer-readable instructions;
compare the hash representation of the obtained portion of the computer-readable instructions to the respective hash information of the hash table for the respective portion of the computer-readable instructions; and
execute the obtained portion of the computer-readable instructions on the on-chip memory device responsive to a determination that the hash representation of the portion of the computer-readable instructions correlates to hash information of the hash table.

18. The computing system of claim 17, wherein the off-chip data storage device is separate from the semiconductor device package.

19. The computing system of claim 17, the processing circuitry to enter an error state responsive to a determination that the hash representation of the portion of the computer-readable instructions does not correlate to the hash information of the hash table.

20. The computing system of claim 17, the processing circuitry to evict a portion of the computer-readable instructions from the on-chip memory device responsive to a determination that the hash representation of the obtained portion does not correlate to the hash information.

* * * * *